(12) United States Patent
Hasegawa et al.

(10) Patent No.: US 8,728,678 B2
(45) Date of Patent: May 20, 2014

(54) FREQUENCY CONTROL OF DC/DC CONVERTER IN A FUEL CELL SYSTEM

(71) Applicants: Takahiko Hasegawa, Toyota (JP); Kota Manabe, Toyota (JP)

(72) Inventors: Takahiko Hasegawa, Toyota (JP); Kota Manabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/646,033

(22) Filed: Oct. 5, 2012

(65) Prior Publication Data

US 2013/0045432 A1 Feb. 21, 2013

Related U.S. Application Data

(62) Division of application No. 12/810,124, filed as application No. PCT/JP2008/073052 on Dec. 18, 2008.

(30) Foreign Application Priority Data

Dec. 25, 2007 (JP) ................................. 2007-333027

(51) Int. Cl.
*H01M 8/04* (2006.01)

(52) U.S. Cl.
USPC ............................ 429/432; 429/428; 429/430

(58) Field of Classification Search
None
See application file for complete search history.

(56) References Cited

U.S. PATENT DOCUMENTS

| | | | |
|---|---|---|---|
| 2002/0038732 A1 | 4/2002 | Sugiura et al. | |
| 2002/0071295 A1* | 6/2002 | Nishikawa | 363/21.15 |
| 2006/0280977 A1* | 12/2006 | Sakajo et al. | 429/23 |
| 2008/0220298 A1* | 9/2008 | Ishikawa et al. | 429/22 |
| 2010/0013490 A1 | 1/2010 | Manabe et al. | |

FOREIGN PATENT DOCUMENTS

| | | |
|---|---|---|
| JP | 2002-118979 A | 4/2002 |
| JP | 2004-173421 A | 6/2004 |
| JP | 2006-033934 A | 2/2006 |
| WO | 02/29916 A2 | 4/2002 |
| WO | 2005/076433 A1 | 8/2005 |
| WO | 2007/004718 A1 | 1/2007 |
| WO | 2008/032537 A1 | 3/2008 |

OTHER PUBLICATIONS

Office Action issued on Dec. 4, 2012 in Parent U.S. Appl. No. 12/810,124.
Office Action mailed on Jan. 11, 2013 in U.S. Appl. No. 13/646,045.
Final Office Action mailed Jun. 5, 2013 in co-pending parent U.S. Appl. No. 12/810,124.
Office Action mailed Nov. 22, 2013 in U.S. Appl. No. 13/646,045.
Examiner's Answer mailed Feb. 3, 2014 in U.S. Appl. No. 12/810,124.

\* cited by examiner

*Primary Examiner* — Ula C Ruddock
*Assistant Examiner* — Tony Chuo
(74) *Attorney, Agent, or Firm* — Kenyon & Kenyon LLP

(57) ABSTRACT

A fuel cell system capable of improving the voltage controllability of a converter provided in the system is provided. A controller judges whether or not a passing power of a DC/DC converter falls within a reduced response performance area for the number of active phases as of the present moment. When the controller determines that the passing power of the DC/DC converter falls within the reduced response performance area, the controller determines the number of phases which avoids the driving within the reduced response performance area, and outputs a command for switching to the determined number of phases (phase switching command) to the DC/DC converter.

1 Claim, 8 Drawing Sheets

FREQUENCY CONTROL OF DC/DC CONVERTER IN A FUEL CELL SYSTEM

This is a division of application Ser. No. 12/810,124 filed 22 Jun. 2010, which is a 371 national phase application of PCT/JP2008/073052 filed 18 Dec. 2008, which claims priority to Japanese Patent Application No. 2007-333027 filed 25 Dec. 2007, the contents of which are incorporated herein by reference.

TECHNICAL FIELD

The present invention relates to a fuel cell system that controls an output voltage of a fuel cell by means of a DC/DC converter that increases/decreases an output voltage of a fuel cell stack, and a mobile object equipped with the system.

BACKGROUND ART

A fuel cell stack is an energy conversion system for converting chemical energy to electric energy through an electrochemical reaction caused by supplying a fuel gas and an oxidant gas to a membrane-electrode assembly. In particular, a solid polymer electrolyte fuel cell stack in which a solid polymer membrane is used as an electrolyte is low in cost, easy to be reduced in size, and high in output density, and therefore is expected to be used as a vehicle-mounted power source.

Regarding a fuel cell system equipped with such a fuel cell stack, for example, cited reference 1 below proposes a method of enhancing the operation efficiency of a system by setting, with the use of a DC/DC converter, an output of a fuel cell to account for 65% to 80% of the entire output.
Patent Document 1: JP2002-118979 A

DISCLOSURE OF THE INVENTION

Problem to be Solved by the Invention

However, regarding a DC/DC converter that controls an output voltage of a fuel cell stack to increase/decrease through a switching operation by a switching device, an operating range where a dead time compensation value varies greatly depending on the value of a passing power exists. In the operating range where the dead time compensation value varies greatly (for convenience, hereinafter referred to as a reduced response performance area), the response performance of the DC/DC converter is known to be reduced. The DC/DC converter driven with the reduced response performance area has invited, e.g., a problem in that the energy efficiency of the entire system degrades due to poor controllability of an output voltage of the converter (hereinafter referred to as voltage controllability of the converter).

The present invention has been made in light of the above circumstances, and an object of the invention is to provide a fuel cell system in which the voltage controllability of a converter provided in the system can be improved.

Means for Solving the Problem

In order to solve the problem described above, provided according to an aspect of the present invention is a fuel cell system comprising: a multiphase DC/DC converter for increasing/decreasing an output voltage of a fuel cell; a setting unit that sets the number of active phases for the DC/DC converter; a calculation unit that calculates a passing power of the DC/DC converter; a number-of-phases control unit that, when the calculated passing power falls within a reduced response performance area, switches from the number of active phases as of the present moment to the number of active phases in which the passing power does not fall within the reduced response performance area; and a drive control unit that drives the DC/DC converter with the number of phases after the switching.

With such a configuration, when the calculated passing power of the DC/DC converter falls within the reduced response performance area for the number of active phases as of the relevant moment, the number of active phases for the DC/DC converter 60 is switched to the number of active phases in which the passing power does not fall within the reduced response performance area. This enables the drive of the DC/DC converter which avoids the reduced response performance area, thereby improving the voltage controllability of the DC/DC converter compared to related art.

Provided according to an aspect of the present invention is a fuel cell system comprising: a DC/DC converter for increasing/decreasing an output voltage of a fuel cell; a calculation unit that calculates a passing power of the DC/DC converter; a power control unit that determines, when the calculated passing power falls within a reduced response performance area, a passing power of the DC/DC converter so that the passing power does not fall within the reduced response performance area; and a drive control unit that drives the DC/DC converter so as to obtain the determined passing power.

With such a configuration, when the calculated passing power of the DC/DC converter falls within the reduced response performance area, the passing power of the DC/DC converter is shifted such that the passing power does not fall within the reduced response performance area. This enables the drive of the DC/DC converter which avoids the reduced response performance area, thereby improving the voltage controllability of the DC/DC converter compared to related art in a similar way to the above.

Further, provided according to an aspect of the present invention is a fuel cell system comprising: a DC/DC converter for increasing/decreasing an output voltage of a fuel cell; a calculation unit that calculates a passing power of the DC/DC converter; a setting unit that sets a carrier frequency of a control signal for controlling a switching operation of the DC/DC converter; a frequency control unit that changes, when the calculated passing power falls within a reduced response performance area, the carrier frequency as of the present moment to a carrier frequency with which the passing power does not fall within the reduced response performance area; and a drive control unit that drives the DC/DC converter with the carrier frequency after the change.

With such a configuration, when the calculated passing power of the DC/DC converter falls within the reduced response performance area, the carrier frequency of the DC/DC converter as of the present moment is changed to a carrier frequency with which the passing power does not fall within the reduced response performance area. This enables the drive of the DC/DC converter which avoids the reduced response performance area, thereby improving the voltage controllability of the DC/DC converter compared to related art in a similar way to the above.

Further, provided according to an aspect of the present invention is a fuel cell system comprising: a multiphase DC/DC converter for increasing/decreasing an output voltage of a fuel cell; a detection unit that detects a request voltage for the fuel cell; a parameter control unit that controls at least one or more parameters, the number of active phases, a passing power and a carrier frequency of the DC/DC converter based on the request voltage; and a drive control unit that drives the DC/DC converter in accordance with the controlled parameters.

In the configuration above, it is preferable that the fuel cell system further comprises a judgment unit that judges whether or not the request voltage exceeds a preset threshold, wherein, when the request voltage exceeds the preset threshold, the parameter control unit controls at least one or more parameters, the number of drive phases, the passing power and the carrier frequency of the DC/DC converter based on the request voltage.

Further, provided according to an aspect of the present invention is a mobile object comprising, as a power source, a fuel cell system provided with a fuel cell and a multiphase DC/DC converter for increasing/decreasing an output voltage of the fuel cell, the mobile object comprising: a sensor that detects an acceleration opening degree of the mobile object; a parameter control unit that controls at least one or more parameters, the number of active phases, a passing power and a carrier frequency of the DC/DC converter based on the detected acceleration opening degree; and a drive control unit that drives the DC/DC converter in accordance with the controlled parameters.

Effect of the Invention

According to the present invention, the voltage controllability of a converter provided in a system can be improved.

BEST MODE FOR CARRYING OUT THE INVENTION

Embodiments according to the present invention will hereinafter be described with reference to the drawings.

FIG. 1 shows a primary configuration of a fuel cell system 10 according to an embodiment. The fuel cell system 10 is a vehicle-mounted power supply system provided in a power supply system of a fuel cell vehicle. The fuel cell system 10 includes a fuel cell stack 20, an FC auxiliary apparatus 21, a cell voltage detector 22, a traction inverter 30, a traction motor 40, a secondary battery 50, a DC/DC converter 60, a vehicle auxiliary apparatus 70, a controller 80 and sensors 90.

The fuel cell stack 20 is a power generation apparatus having a stack configuration in which a plurality of cells is connected in series, the cells each being constituted by arranging a pair of electrodes (anode, cathode) with a solid polymer electrolyte sandwiched therebetween. Hydrogen ions that are generated at the anode through a catalyst reaction pass through the solid polymer electrolyte membrane, move to the cathode, and cause an electrochemical reaction with an oxidant gas at the cathode, generating electric power.

The FC auxiliary apparatus 21 includes a fuel gas supply system (hydrogen storage tank, hydrogen cutoff valve, hydrogen supply pressure regulator, etc.) for supplying a fuel gas (hydrogen gas) to the anode of the fuel cell stack 20, an oxidant gas supply system (air compressor, etc.) for supplying an oxidant gas (air) to the cathode of the fuel cell stack 20 and other auxiliary apparatuses (humidifying module for humidifying the fuel gas and the oxidant gas, fuel cell cooling apparatus, etc.).

Upon receiving the supply of the fuel gas and oxidant gas from the FC auxiliary apparatus 21, the fuel cell stack 20 outputs electric energy through an electrochemical reaction.

The traction motor 40 is an electric motor for obtaining a travel driving force, and is constituted by, e.g., a three-phase synchronous motor.

The traction inverter 30 includes, e.g., a three-phase bridge circuit constituted by six power transistors, and converts direct-current power supplied from the fuel cell stack 20 or the secondary battery 50 to alternating-current power (three-phase alternating current) through a switching operation of the power transistors and supplies the alternating-current power to the traction motor 40. The controller 80 has a function of controlling a power conversion operation of the traction inverter 30, and outputs, for example, respective alternating-current voltage command values of a U-phase, V-phase and W-phase as switching commands to the traction inverter 30, and controls the output torque and revolution speed of the traction motor 40.

The secondary battery 50 is a power storage device that is capable of storing and discharging power, and functions as a storage source of regenerated energy during braking regeneration and an energy buffer during a load variation as a result of acceleration or deceleration of the fuel cell vehicle. The secondary battery 50 is preferably constituted by, for example, a nickel/cadmium battery, a nickel/hydrogen battery, or a lithium secondary battery.

Instead of the second battery 50, a capacitor (electric double layer capacitor, electrolytic capacitor, etc.) as a power storage device may be connected to a primary side of the DC/DC converter 60.

The DC/DC converter 60 is a voltage conversion unit for controlling an output voltage of the fuel cell stack 20 or the secondary battery 50 to increase/decrease. The DC/DC converter 60 has a circuit configuration of a multiphase converter in which a circuit similar to an inverter, which converts an input voltage (direct-current voltage) to an alternating-current voltage, is combined with a circuit that rectifies the alternating current and converts it to an output voltage (direct-current voltage). More specifically, the DC/DC converter 60 has a circuit configuration of a three-phase full-bridge converter constituted by twelve IGBT devices Tr1 to Tr12, twelve diode devices D1 to D12, three reactors L1 to L3 and two smoothing capacitors C1 to C2.

When the DC/DC converter 60 has a low passing power, a single-phase operation is carried out since it involves a low switching loss compared with a three-phase operation. When carrying out the single-phase operation, the pair of IGBT devices Tr1 and Tr10 and the pair of IGBT devices Tr4 and Tr7 operate. Meanwhile, when the DC/DC converter 60 has a high passing power, a three-phase operation is carried out since it involves a low switching loss compared with a single-phase operation. When carrying out the three-phase operation, the pair of IGBT devices Tr1 and Tr10 and the pair of IGBT devices Tr4 and Tr7; the pair of IGBT devices Tr2 and Tr11 and the pair of IGBT devices Tr5 and Tr8; and the pair of IGBT devices Tr3 and Tr12 and the pair of IGBT devices Tr6 and Tr9 operate with a phase difference of 120 degrees.

The secondary battery 50 is connected to the primary side of the DC/DC converter 60, while the fuel cell stack 20, the traction inverter 30 and the vehicle auxiliary apparatus 70 are connected in parallel to a secondary side of the DC/DC converter 60.

For example, the DC/DC converter 60 controls an operating point (output voltage, output current) of the fuel cell stack 20 by increasing/decreasing the output voltage of the secondary battery 50. The DC/DC converter 60 increases the output voltage of the secondary battery 50 to supply direct-current power to the traction inverter 30 when the fuel cell vehicle performs a powering driving by means of the traction motor 40, and on the other hand, decreases the regenerated direct-current voltage and charges the secondary battery 50 with the resultant voltage when the fuel cell vehicle performs regenerative braking by the traction motor 40. The DC/DC converter 60 also has a function of decreasing the output voltage of the fuel cell stack 20 and charging the secondary battery 50 with the resultant voltage in order to store surplus power of the fuel cell stack 20.

The vehicle auxiliary apparatus 70 includes various auxiliary apparatuses such as a compressor motor for pressurizing an oxidant gas, a pump drive motor for supplying pure water to a humidifying module, a coolant pump drive motor for cooling the fuel cell stack 20 and a radiator fan motor.

The controller 80 is a control unit including a central processing unit (CPU), storage devices (ROM, RAM), an input/output interface, etc. The controller 80 controls the fuel cell vehicle based on, e.g., various signals output from the sensors 90. The sensors 90 include, e.g., an ignition switch 91, a vehicle speed sensor 92 and an acceleration sensor 93.

For example, when receiving an ignition signal output from the ignition switch 91, the controller 80 starts the operation of the fuel cell system 10, and obtains the power required for the entire system based on an acceleration-opening-degree signal output from the acceleration sensor 93, a vehicle speed signal output from the vehicle speed sensor 92, etc. The power required for the entire system corresponds to the total value of vehicle driving power and auxiliary-apparatus power. The auxiliary-apparatus power includes, e.g., power consumed by vehicle-mounted auxiliary apparatuses (humidifier, air compressor, hydrogen pump, coolant circulation pump, etc.), power consumed by devices necessary for vehicle driving (change gear, wheel control device, steering device, suspension device, etc.), and power consumed by devices arranged in an occupant space (air-conditioning device, illumination device, audio equipment, etc.).

The controller (calculation unit) 80 determines the distribution of output power (i.e., power distribution) between the fuel cell stack 20 and the secondary battery 50, and then controls the FC auxiliary apparatus 21 so that the amount of power generated by the fuel cell stack 20 corresponds to target power to adjust the supply of reaction gas to the fuel cell stack 20 and also controls the DC/DC converter 60 to adjust the output voltage of the fuel cell stack 20, thereby controlling the operating point (output voltage, output current) of the fuel cell stack 20. Moreover, in order to obtain a target vehicle speed in accordance with an acceleration opening degree, the controller 80 outputs, for example, respective alternating-current voltage command values of a U-phase, V-phase and W-phase as switching commands to the traction inverter 30, and controls the output torque and revolution speed of the traction motor 40.

FIG. 2 is a graph showing the relationship between a passing power and a dead time compensation value of the DC/DC converter 60 for each of the numbers of active phases. The dotted line indicates the graph for a three-phase operation (three-phase drive), and the solid line indicates the graph for a single-phase operation (single-phase drive). In the three-phase drive, the dead time compensation value varies greatly in the operating range of around −5 kW (e.g., −5 kW±α1 kW) and the operating range of around 5 kW (e.g., 5 kW±α1 kW), and thus these two operating ranges each correspond to a reduced response performance area. Meanwhile, in the single-phase drive, the dead time compensation value varies greatly in the operating range of around −2.5 kW (e.g., −2.5 kW±α2 (<α1) kW) and the operating range of around 2.5 kW (e.g., 2.5 kW±α2 kW), and thus these two operating ranges each correspond to a reduced response performance area. As described above, the reduced response performance areas differ depending on the number of active phases for the DC/DC converter 60. Therefore, even with the same passing power, a drive control that avoids the reduced response performance areas (hereinafter referred to as reduced-performance area avoidance control) can be attained by changing the number of active phases.

Note that the dead time refers to a short-circuit prevention period set to prevent a short-circuit current from flowing between an upper-arm IGBT device and a lower-arm IGBT device (e.g., between IGBT device Tr1 and IGBT device Tr7) in the DC/DC converter 60.

Next, the reduced-performance area avoidance control for the DC/DC converter 60 which is executed by the controller 80 at predetermined moments (e.g., when the operation is started or stopped, or at constant time intervals during the operation) will be described in detail with reference to FIG. 3. Note that the description below assumes the case where a three-phase drive is set as the initial setting for the DC/DC converter 60.

FIG. 3 is a flowchart showing the reduced performance area avoidance control processing according to the first embodiment.

The controller 80 obtains the power required for the entire system based on signals (acceleration-opening-degree signal, etc.) output from the various sensors, and determines the power distribution between the fuel cell stack 20 and the secondary battery 50 (step S301).

The controller (calculation unit) 80 judges whether or not the passing power of the DC/DC converter 60 which is obtained in accordance with the power distribution falls within the reduced response performance area for the number of active phases as of the present moment (here, three phases) (step S302).

If the controller 80 determines that the passing power of the DC/DC converter 60 does not fall within the reduced response performance area (step S302: NO), this indicates that the DC/DC converter 60 is being driven suitably (i.e., the voltage controllability has not been degraded). Thus, the controller 80 leaves the processing of this routine to end the processing.

Meanwhile, if the controller (number-of-phases control unit) 80 determines that the passing power of the DC/DC converter 60 falls within the reduced response performance area (step S302: YES), the controller 80 determines the number of phases which avoids the drive within the reduced response performance area (i.e., the changed number of active phases) (step S303). The controller (setting unit, drive control unit) 80 outputs (sets) a command for switching to the determined number of phases (phase switching command) to the DC/DC converter 60 (step S304), drives the DC/DC converter 60 with the number of phases after the switching and then ends the processing.

As described above, when the passing power of the DC/DC converter 60 falls within the reduced response performance area for the number of active phases as of the relevant moment, the number of active phases for the DC/DC converter 60 is switched. This enables the drive of the DC/DC converter 60 which avoids the reduced response performance area, thereby improving the voltage controllability of the DC/DC converter 60 compared to related art.

Here, the example above shows switching between a three phase and a single phase as switching of the number of active phases for the DC/DC converter 60, but switching may be performed between three phases, two phases or a single phase. The number of phases for switching may be arbitrarily set in accordance with the number of active phases N (N≥2) for the mounted DC/DC converter 60. Further, when it is determined in step S302 that the reduced response performance area cannot be avoided in any number of active phases, the controller 80 may select the most energy-efficient number of active phases (e.g. three phases) from among the possible number of active phases for switching. As described above, the technical idea in which the number of active phases for the DC/DC converter 60 is determined in consideration of energy efficiency may be applied to not only the case where it is determined that the reduced response performance area cannot be avoided but also to the case where it is determined that the passing power does not fall within the reduced response performance area.

B. Second Embodiment

FIG. 4 is a graph showing the relationship between a passing power and a dead time compensation value of the DC/DC converter 60 for a certain number of active phases. In the first embodiment above, the drive of the DC/DC converter 60 which avoids the reduced response performance area is enabled by changing the number of active phases. In the second embodiment, the drive of the DC/DC converter 60 which avoids the reduced response performance area is enabled by changing the passing power.

As shown in FIG. 4, a negative reduced response performance area and a positive reduced response performance area exist in a three-phase drive. Here, when the passing power of the DC/DC converter 60 obtained in accordance with the power distribution falls within, e.g., the positive reduced response performance area (see passing power a in FIG. 4), the passing power of the DC/DC converter 60 is shifted in a direction in which an amount of assist by the secondary battery 50 increases (positive direction) without any influence on a system output, thereby avoiding the reduced response performance area (see passing power a→passing power a' in FIG. 4).

On the other hand, when the passing power of the DC/DC converter 60 obtained in accordance with the power distribution falls within, e.g., the negative reduced response performance area (see passing power b in FIG. 4), the passing power of the DC/DC converter 60 is shifted in a direction in which an amount of power generated by the fuel cell stack 20 increases (negative direction) without any influence on the system output, thereby avoiding the reduced response performance area (see passing power b→passing power b' in FIG. 4). Note that the surplus power generated by shifting the passing power of the DC/DC converter 60 to the positive side may be stored in the secondary battery 50, consumed by the vehicle auxiliary apparatus 70, or converted to thermal energy to be released to the atmosphere. Further, when the passing power of the DC/DC converter 60 is shifted to the negative side, it is sufficient that power may be supplied from the secondary battery 50 to make up for a deficiency of power. As described above, the reduced response performance area may be avoided by changing the passing power.

Next, the reduced-performance area avoidance control for the DC/DC converter 60 which is executed by the controller 80 at predetermined moments (e.g., when the operation is started or stopped, or at constant time intervals during the operation) will be described in detail with reference to FIG. 5.

FIG. 5 is a flowchart showing the reduced performance area avoidance control processing according to the second embodiment.

The controller 80 obtains the power required for the entire system based on signals (acceleration-opening-degree signal, etc.) output from the various sensors, and determines the power distribution between the fuel cell stack 20 and the secondary battery 50 (step S401).

The controller (calculation unit) 80 judges whether or not the passing power of the DC/DC converter 60 which is obtained in accordance with the power distribution falls within either the positive or negative reduced response performance area (step S402).

If the controller 80 determines that the passing power of the DC/DC converter 60 does not fall within the reduced response performance area (step S402: NO), this indicates that the DC/DC converter 60 is being driven suitably (i.e., the voltage controllability has not been degraded). Thus, the controller 80 leaves the processing of this routine to end the processing.

Meanwhile, if the controller (power control unit) 80 determines that the passing power of the DC/DC converter 60 falls within the reduced response performance area (step S402: YES), the controller 80 determines a passing power after the shift so as to shift the passing power of the DC/DC converter 60 without causing a significant influence on the system output (step S403). For example, when the passing power of the DC/DC converter 60 falls within, e.g., the positive reduced response performance area, the passing power of the DC/DC converter 60 is shifted in a direction in which an amount of assist by the secondary battery 50 increases (positive direction) without any influence on the system output, thereby avoiding the reduced response performance area (see passing power a→passing power a' in FIG. 4).

On the other hand, when the passing power of the DC/DC converter 60 obtained in accordance with the power distribution falls within, e.g., the negative reduced response performance area, the passing power of the DC/DC converter 60 is shifted in a direction in which an amount of power generated by the fuel cell stack 20 increases (negative direction) without any influence on the system output, thereby avoiding the reduced response performance area (see passing power b→passing power b' in FIG. 4). Specifically, the controller (drive control unit) 80 outputs a power shift command to the DC/DC converter 60 in order to obtain the determined passing power after the shift (step S404), controls the drive of the DC/DC converter 60 so as to obtain the passing power after the shift, and then ends the processing.

As described above, the drive of the DC/DC converter which avoids the reduced response performance area may also be enabled by shifting the passing power of the DC/DC converter.

C. Third Embodiment

FIG. 6 is a graph showing the relationship between a passing power and a dead time compensation value of the DC/DC converter 60 for a certain number of active phases. The solid line indicates the graph for the case where a switching control of the DC/DC converter 60 is carried out with a control signal with a carrier frequency Fn, and the dotted line indicates the graph for the case where a switching control of the DC/DC converter 60 is carried out with a control signal with a carrier frequency Fm (<Fn). In the second embodiment above, the drive of the DC/DC converter 60 which avoids the reduced response performance area is enabled by changing the passing power. In a third embodiment, the drive of the DC/DC converter 60 which avoids the reduced response performance area is enabled by changing the carrier frequency.

As shown in FIG. 6, a reduced response performance area in which a dead time compensation value varies greatly changes in accordance with the carrier frequency of the DC/DC converter 60. This is because a variation $\Delta I$ of current flowing in the reactors of the DC/DC converter 60 varies by changing a carrier frequency F, and the dead time compensation value varies accordingly.

$$\Delta I = V^* \Delta T / L$$

$$\Delta T = 1/F$$

V represents a voltage, L represents an inductance, I represents a current, and F represents a carrier frequency.

FIG. 7 shows the relationship between a control signal for carrying out a switching control over IGBT devices Tr1 to Tr12 and the ripple current flowing in reactors L1 to L3. For the convenience of explanation, the case of a single-phase operation will be described as an example. A time period Tn indicates a time period during which IGBT devices Tr1 and Tr10 are turned on, and a time period Tp indicates a time period during which IGBT devices Tr4 and Tr7 are turned on. A carrier cycle corresponds to Tn+Tp. Assuming that the maximum value of the ripple current is represented by In and that the minimum value thereof is represented by Ip, the ripple current width corresponds to In−Ip. ZP represents a point of zero crossing of the ripple current (hereinafter referred to as a zero crossing point).

When the zero crossing point ZP exists, the direction (sign) of the ripple current is often reversed, and thus the voltage control performance of the DC/DC converter 60 is reduced remarkably. Therefore, the zero crossing point ZP emerges in an area where a dead time compensation value varies greatly, i.e., a reduced response performance area. Meanwhile, when the maximum value In is a negative value or when the minimum value Ip is a positive value, the zero crossing point ZP does not exist, and thus the DC/DC converter 60 has satisfactory voltage control performance. Further, when the zero crossing point ZP exists at the center of the ripple current width, the sign of the ripple current is reversed symmetrically with respect to the zero crossing point ZP, and thus the DC/DC converter 60 has satisfactory voltage control performance.

As shown in FIG. 7, as the carrier frequency is increased, the time periods Tn and TP become shorter. Thus, it can be understood that the ripple current width becomes smaller. Conversely, as the carrier frequency is decreased, the time periods Tn and TP become longer, and thus the ripple current width becomes larger. When the ripple current width is changed, the point of zero crossing of the ripple current varies accordingly. Therefore, the carrier frequency is changed, thereby moving the operating point of the DC/DC converter 60 out of the reduced response performance area.

Next, the reduced-performance area avoidance control of the DC/DC converter 60 which is executed by the controller 80 at predetermined moments (e.g., when the operation is started or stopped, or at constant time intervals during the operation) will be described in detail with reference to FIG. 8.

FIG. 8 is a flowchart showing the reduced performance area avoidance control processing according to the third embodiment.

The controller 80 obtains the power required for the entire system based on signals (acceleration-opening-degree signal, etc.) output from the various sensors, and determines the power distribution between the fuel cell stack 20 and the secondary battery 50 (step S501).

The controller (calculation unit) 80 judges whether or not the passing power of the DC/DC converter 60 which is obtained in accordance with the power distribution falls within the reduced response performance area (step S502).

If the controller 80 determines that the passing power of the DC/DC converter 60 does not fall within the reduced response performance area (step S502: NO), this indicates that the DC/DC converter 60 is being driven suitably (i.e., the voltage controllability has not been degraded). Thus, the controller 80 leaves the processing of this routine to end the processing.

Meanwhile, if the controller (frequency control unit) 80 determines that the passing power of the DC/DC converter 60 falls within the reduced response performance area (step S502: YES), the controller 80 determines a carrier frequency after a change in order to avoid the reduced response performance area (step S503). The controller (drive control unit) 80 then outputs a carrier-frequency change command (e.g., the carrier frequency Fm→Fn) to the DC/DC converter 60 (step S504), controls the drive of the DC/DC converter 60 with the carrier frequency after the change and then ends the processing.

As described above, the drive of the DC/DC converter which avoids the reduced response performance area may also be enabled by changing the carrier frequency.

D. Modification

The configurations of the embodiments described above may be combined arbitrarily to control the various parameters (the number of active phases, passing power and carrier frequency) of the DC/DC converter 60 to be in the optimum state in accordance with the power variation, thereby improving the voltage controllability of the DC/DC converter 60.

The control of the DC/DC converter 60 which is executed by the controller 80 at predetermined moments (e.g., when the operation is started or stopped, or at constant time intervals during the operation) will hereinafter be described in detail with reference to FIG. 9.

FIG. 9 is a flowchart showing control processing for the DC/DC converter 60 according to a modification.

The controller calculates a rate of change of an acceleration opening degree based on, e.g., an acceleration-opening-degree signal, which is detected in succession by the acceleration sensor (sensor) 93 (step S701). The controller (detection unit, judgment unit) 80 then proceeds to step S702, and compares the obtained rate of change of acceleration opening degree with a preset sudden-change determination threshold (setting threshold) and judges whether or not the obtained rate of change of acceleration opening degree exceeds the sudden-change determination threshold (i.e., whether or not a request voltage for the fuel cell stack 20 has suddenly changed) (step S702). Here, the sudden-change determination threshold is obtained in advance through experiments, etc., and refers to the rate of change of acceleration opening degree for the case of a sudden change of the request voltage for the fuel cell stack 20.

If the controller 80 determines that the request voltage for the fuel cell stack 20 has not changed suddenly (step S702: NO), the controller 80 leaves the processing of this routine to end the processing. Meanwhile, if the controller (parameter control unit) 80 determines that the request voltage for the fuel cell stack 20 has changed suddenly (step S702: YES), the controller 80 controls the parameters, i.e., the number of active phases, passing power and carrier frequency to be in the optimum state in order to improve the voltage controllability of the DC/DC converter 60 (step S703). This will be described with an example. The number of active phases for the DC/DC converter 60 is switched to obtain the minimum current ripple. The carrier frequency of the DC/DC converter 60 is changed to a controllable frequency that is the closest to a duty update cycle. Further, regarding the passing power of the DC/DC converter 60, the passing power is shifted so as to avoid the reduced response performance area based on the determined number of active phases (e.g., three phases) and carrier frequency (e.g., carrier frequency Fm). The controller 80 controls the drive of the DC/DC converter as described above, and then ends the processing.

As described above, according to the embodiment above, the various parameters of the DC/DC converter 60 are switched to be brought into the optimum state even when the request voltage for the fuel cell stack 20 suddenly changes due to a large change in acceleration opening degree (at the time of rapid start, during a rapid acceleration, etc.), thereby improving the voltage controllability of the DC/DC converter 60.

Note that, regarding the control of the DC/DC converter 60 for the case of a sudden change of the request voltage for the fuel cell stack 20, all of the three parameters (the number of active phases, passing power and carrier frequency) may be treated as objects of switching, and also, any one parameter (e.g., the number of active phases) or two parameters (e.g., passing power and carrier frequency) of the parameters may be treated as an object(s) of switching. Further, whether or not the request voltage for the fuel cell stack 20 has changed suddenly may be judged based on various signals such as the vehicle speed signal detected by the vehicle speed sensor 92 and the request power signal from the FC auxiliary apparatus.

DESCRIPTION OF REFERENCE NUMERALS

Figure 1:
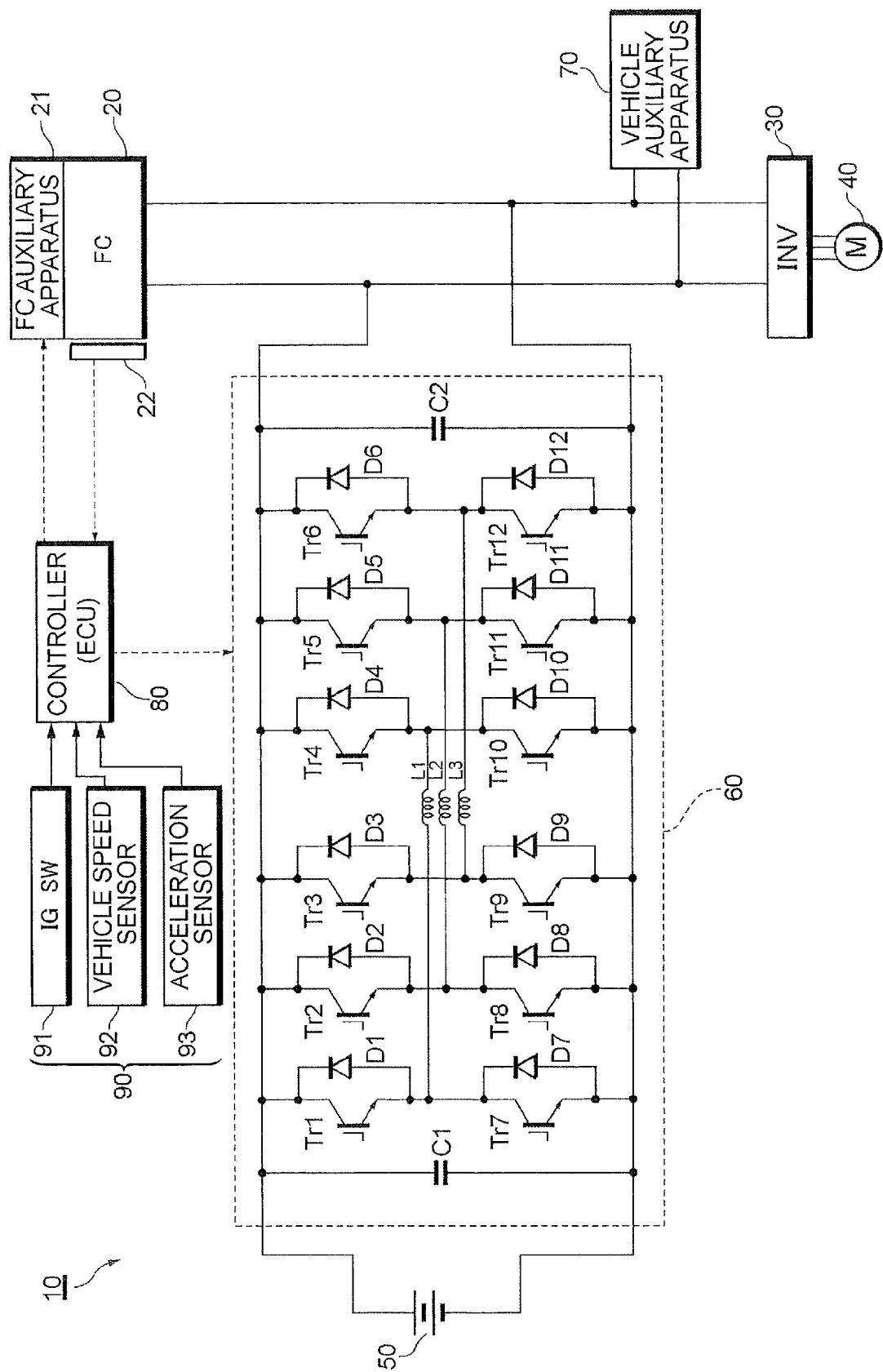
FIG. 1 is a diagram of a primary configuration of a fuel cell system according to a first embodiment.
Figure 2:
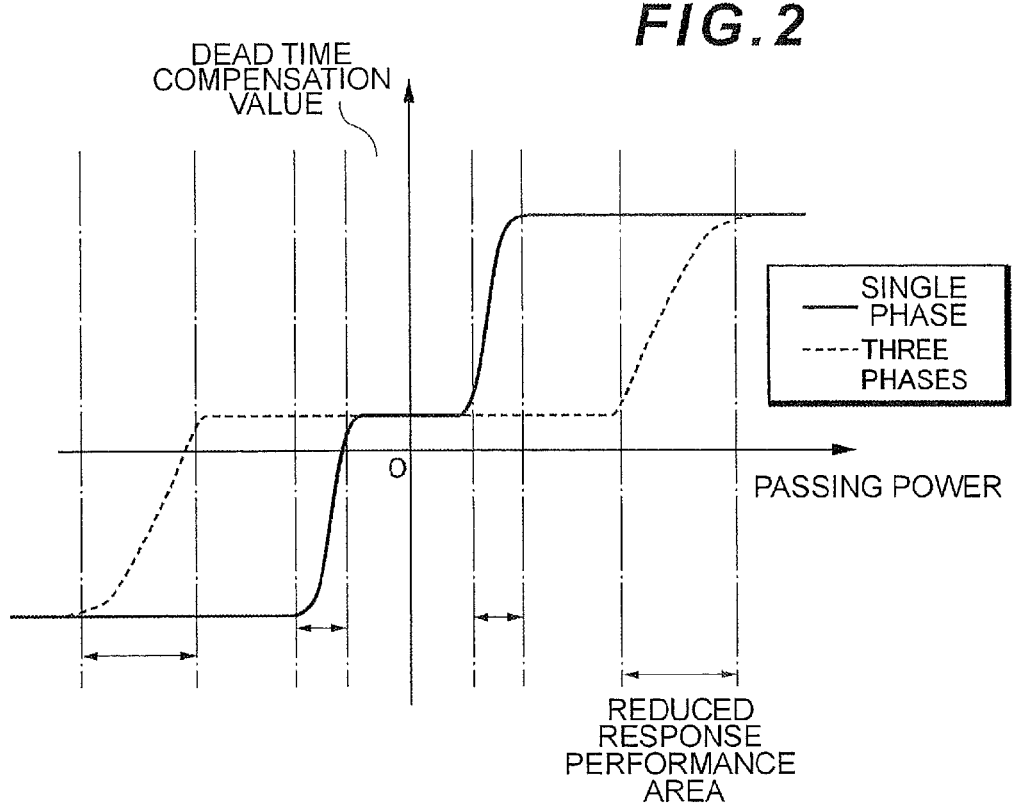
FIG. 2 is a graph showing the relationship between a passing power and a dead time compensation value of a DC/DC converter according to the first embodiment.
Figure 4:
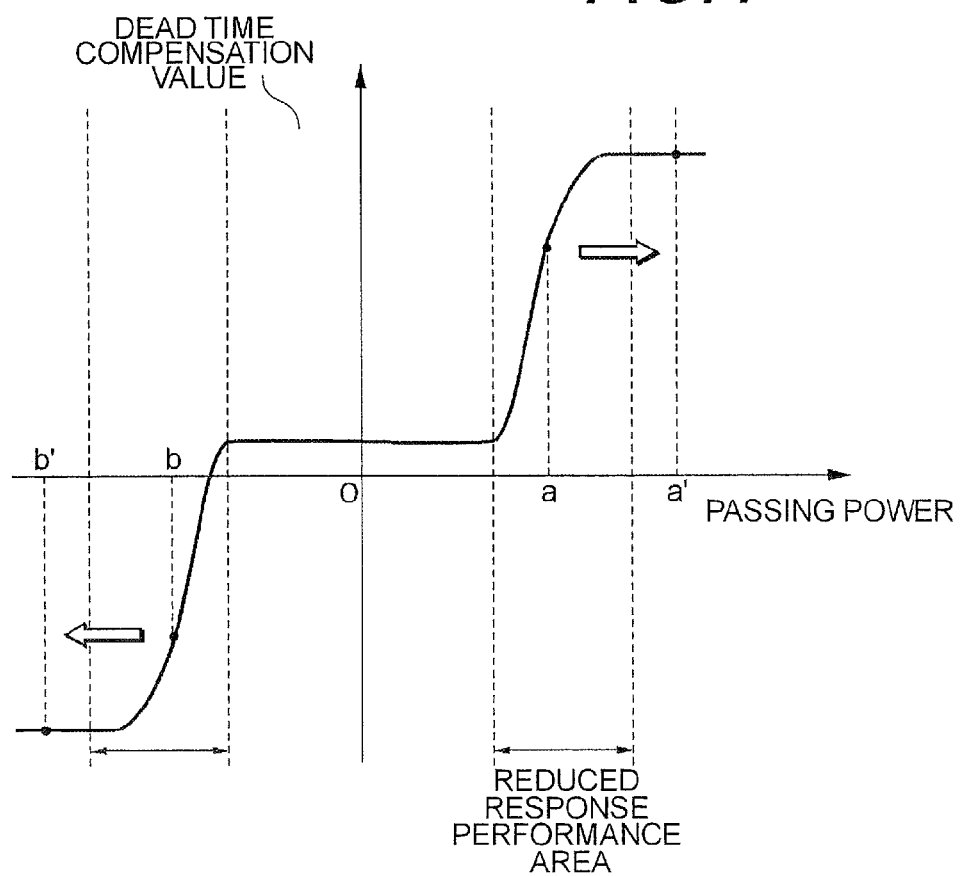
FIG. 4 is a graph showing the relationship between a passing power and a dead time compensation value of a DC/DC converter according to a second embodiment.
Figure 3:
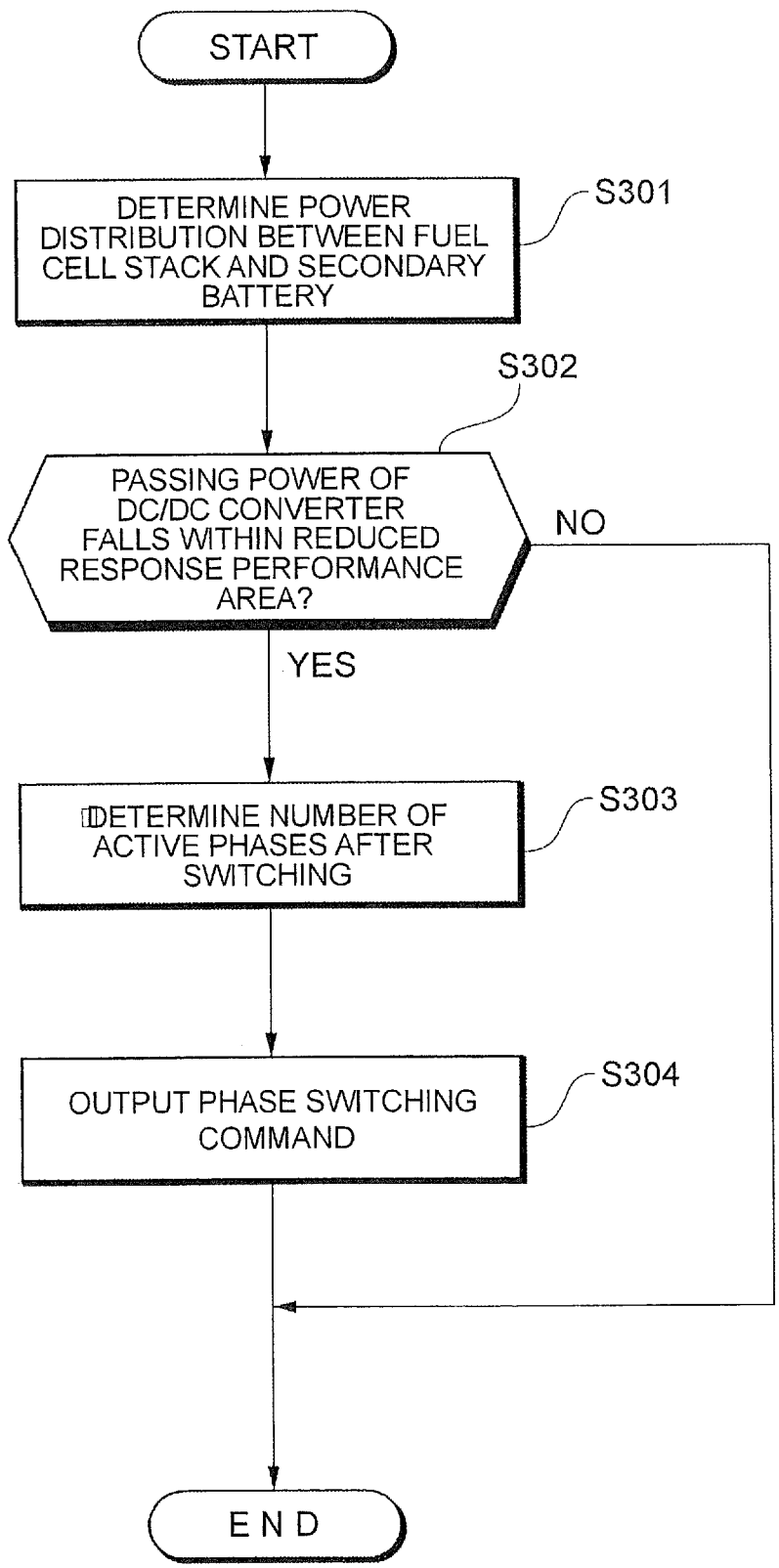
FIG. 3 is a flowchart showing reduced performance area avoidance control processing according to the first embodiment.
Figure 5:
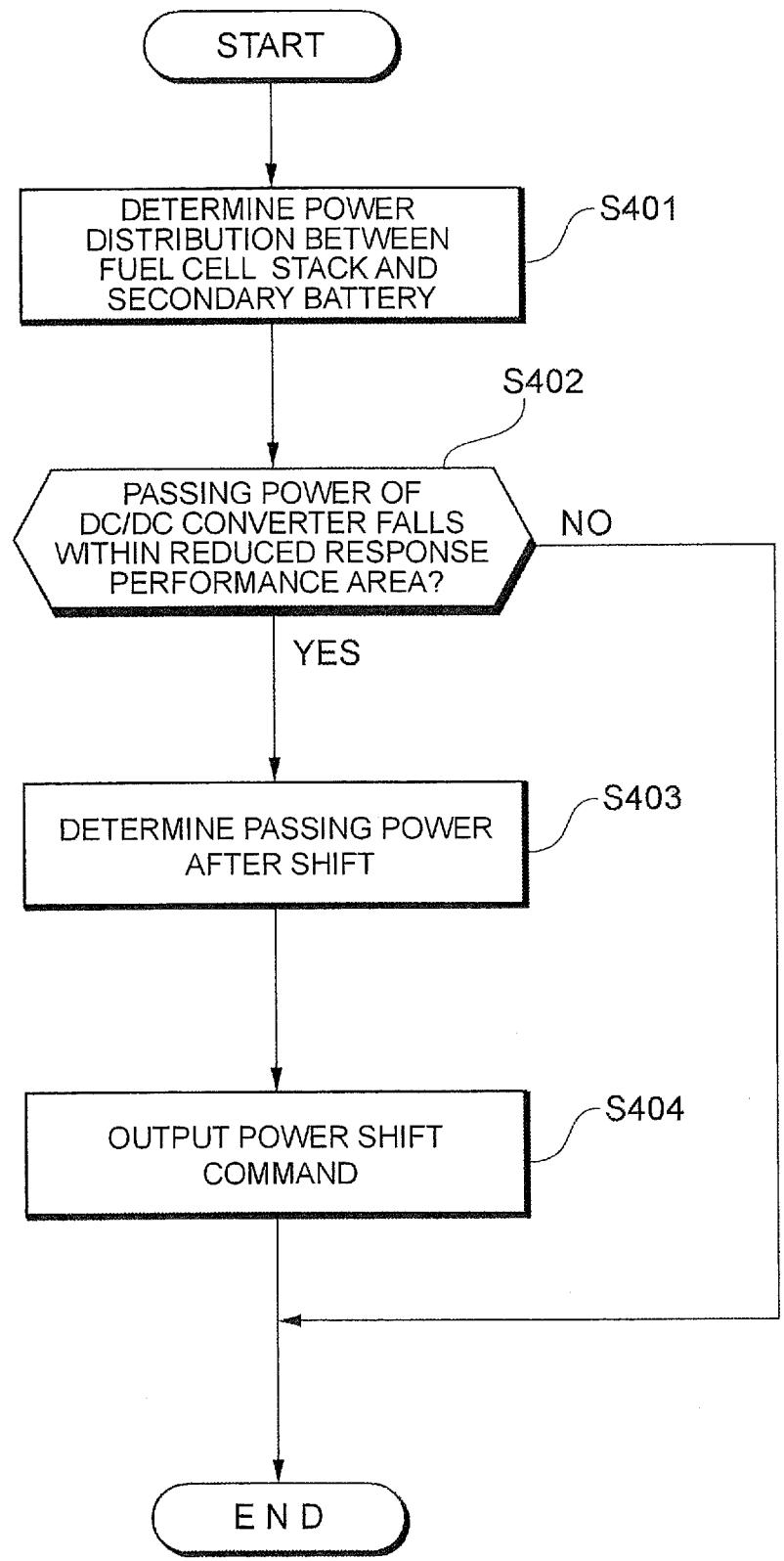
FIG. 5 is a flowchart showing reduced performance area avoidance control processing according to the second embodiment.
Figure 6:
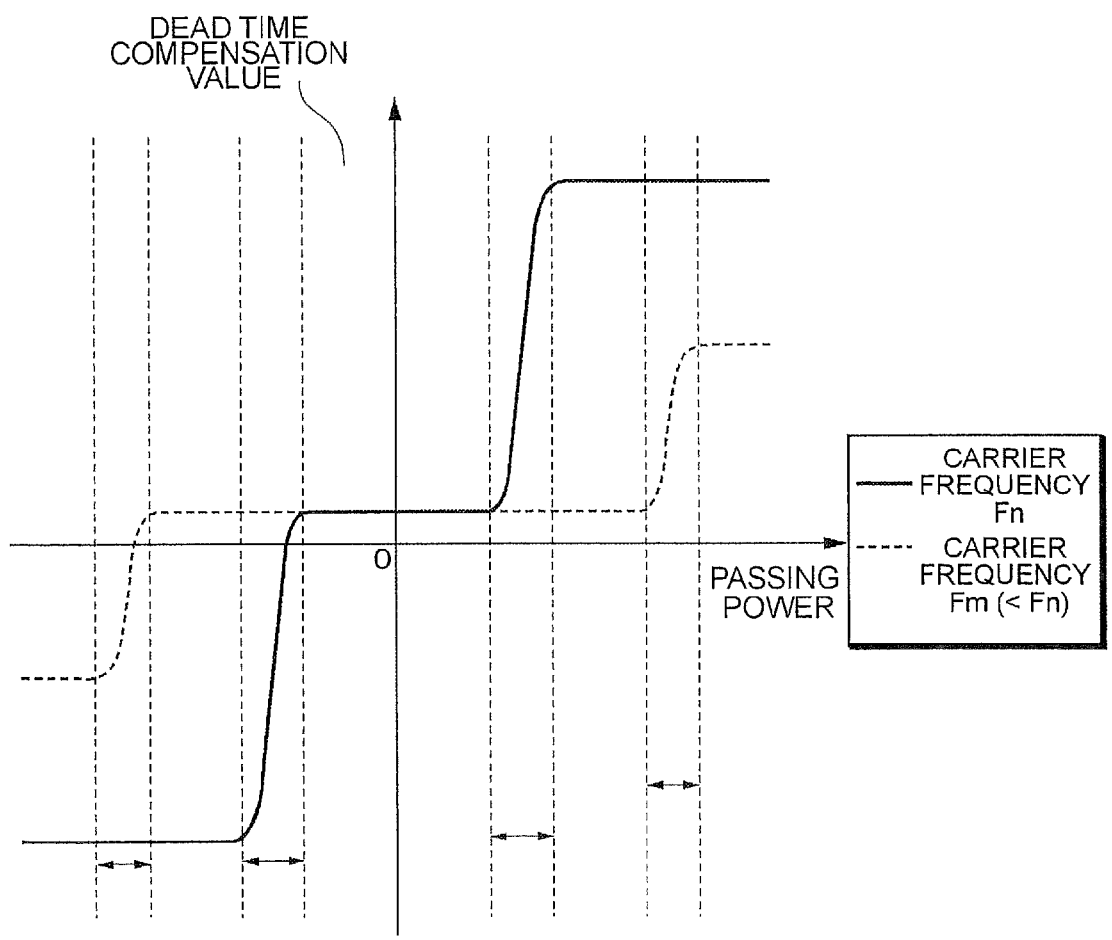
FIG. 6 is a graph showing the relationship between a passing power and a dead time compensation value of a DC/DC converter according to a third embodiment.
Figure 7:
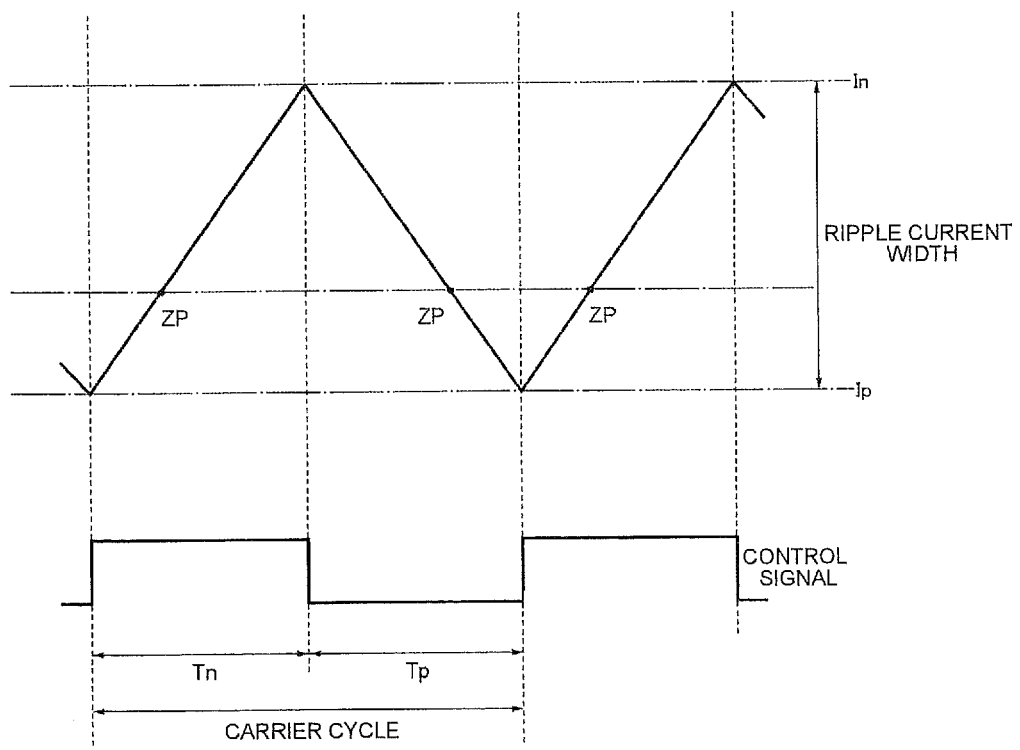
FIG. 7 is a diagram showing the relationship between a control signal and a ripple current in the DC/DC converter according to the third embodiment.
Figure 8:
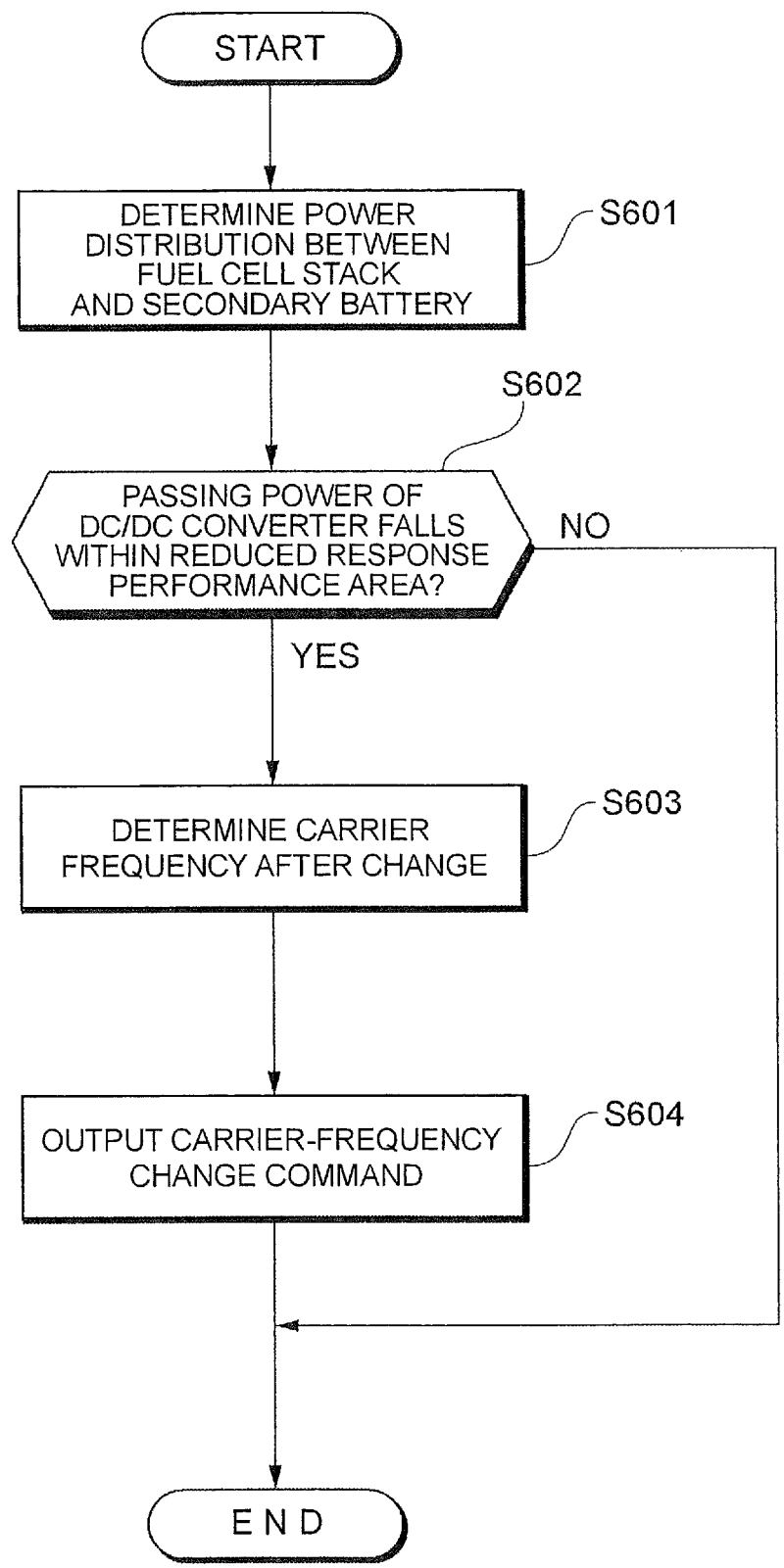
FIG. 8 is a flowchart showing reduced performance area avoidance control processing according to the third embodiment.
Figure 9:
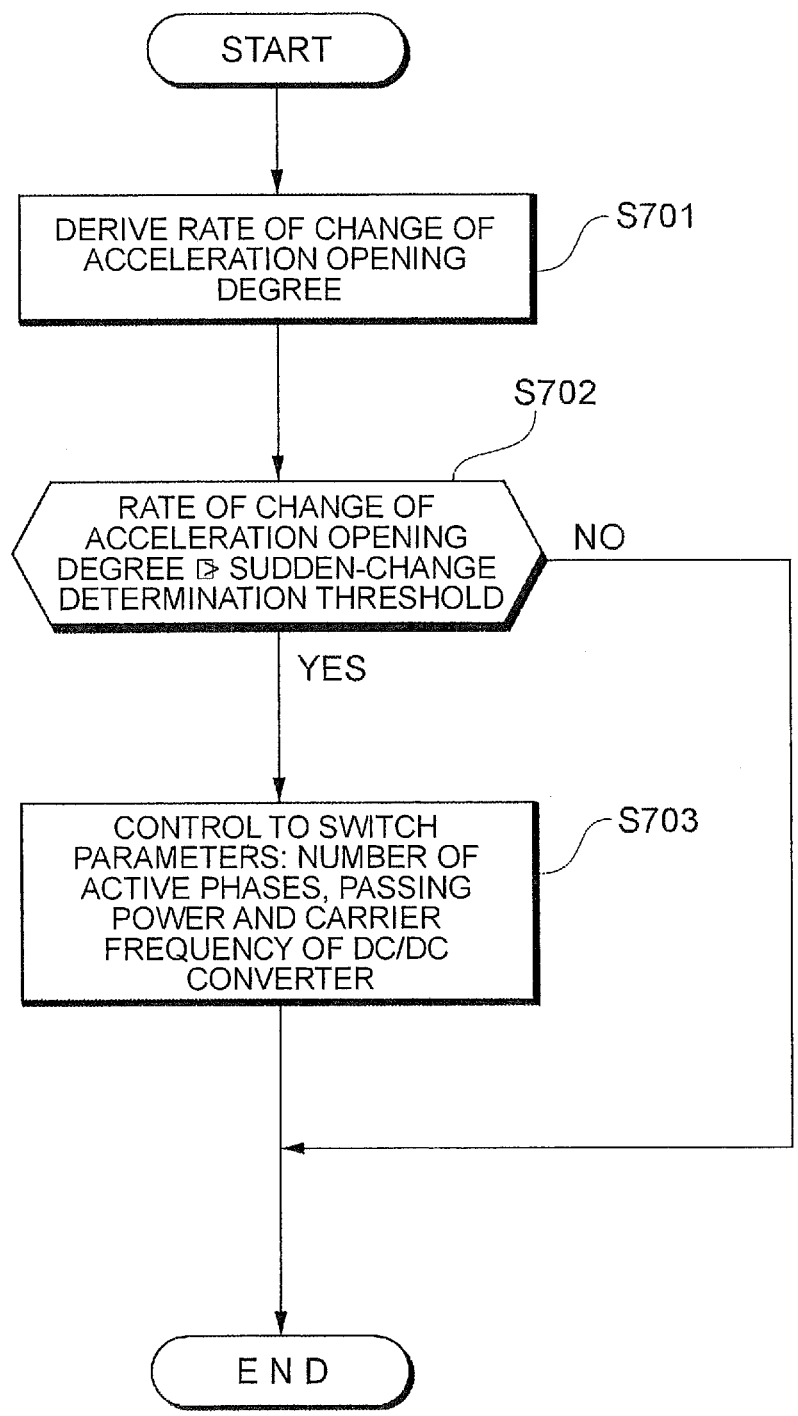
FIG. 9 is a flowchart showing control processing for a DC/DC converter according to a modification.

10: fuel cell system, 20: fuel cell stack, 21: FC auxiliary apparatus, 22: cell voltage detector, 30: traction inverter, 40: traction motor, 50: secondary battery, 60: DC/DC converter, 70: vehicle auxiliary apparatus, 80: controller

What is claimed is:

1. A fuel cell system comprising:
   a DC/DC converter for increasing/decreasing an output voltage of a fuel cell;
   a calculation unit that is programmed to calculate a passing power of the DC/DC converter;
   a setting unit that is programmed to set a carrier frequency of a control signal for controlling a switching operation of the DC/DC converter;
   a frequency control unit that is programmed to change, when the calculated passing power falls within a reduced response performance area, the carrier frequency as of the present moment to a carrier frequency with which the passing power does not fall within the reduced response performance area; and
   a drive control unit that is programmed to drive the DC/DC converter with the carrier frequency after the change.

* * * * *